US006992995B2

(12) United States Patent　　(10) Patent No.: US 6,992,995 B2
Agrawal et al.　　(45) Date of Patent: Jan. 31, 2006

(54) TELECOMMUNICATION ENHANCED MOBILE IP ARCHITECTURE FOR INTRA-DOMAIN MOBILITY

(75) Inventors: Prathima Agrawal, New Providence, NJ (US); Subir Das, Parsippany, NJ (US); Sajal Das, Denton, TX (US); Archan Misra, Morristown, NJ (US)

(73) Assignees: Telcordia Technologies, Inc., Piscataway, NJ (US); University of Texas, Arlington, TX (US)

( * ) Notice: Subject to any disclaimer, the term of this patent is extended or adjusted under 35 U.S.C. 154(b) by 921 days.

(21) Appl. No.: 09/834,237

(22) Filed: Apr. 12, 2001

(65) Prior Publication Data

US 2004/0024901 A1　Feb. 5, 2004

Related U.S. Application Data

(60) Provisional application No. 60/197,880, filed on Apr. 17, 2000.

(51) Int. Cl.
*H04Q 7/00* (2006.01)

(52) U.S. Cl. .................. 370/328; 370/401; 455/432
(58) Field of Classification Search ............... 370/328, 370/331, 338, 401; 455/433, 432.1, 432.3, 455/456.1, 561, 552
See application file for complete search history.

(56) References Cited

U.S. PATENT DOCUMENTS

| 6,445,922 | B1 * | 9/2002 | Hiller et al. | 455/433 |
| 6,473,413 | B1 * | 10/2002 | Chiou et al. | 370/331 |
| 6,510,153 | B1 * | 1/2003 | Inoue et al. | 370/354 |
| 6,636,498 | B1 * | 10/2003 | Leung | 370/338 |
| 6,697,354 | B1 * | 2/2004 | Borella et al. | 370/352 |
| 6,738,362 | B1 * | 5/2004 | Xu et al. | 370/329 |

* cited by examiner

*Primary Examiner*—Ricky Ngo
*Assistant Examiner*—Richard Chang
(74) *Attorney, Agent, or Firm*—Joseph Giordano; James W. Falk

(57) ABSTRACT

Methods and systems are provided for facilitating intra-domain mobility. A first network or domain includes a home agent or SIP proxy of a mobile node. A second network includes two or more subnetworks and at least one mobility agent (MA). Each subnetwork includes an associated subnet agent. To communicate, the mobile node first registers with a subnet agent, receives a local care-of-address and a global care-of-address, and then registers with an MA. The mobile node may then provide the global care-of-address to the home agent. The local care-of-address may enable communication with the mobile node without determining a specific route to the mobile node. The global care-of-address received from the subnet agent may include the address of the MA. Accordingly, the mobile node may transition from any of the subnetworks to another subnetwork without communicating to the home agent information about the transition and without communicating to the MA information about a security association between the mobile node and the home agent.

14 Claims, 6 Drawing Sheets

TELECOMMUNICATION ENHANCED MOBILE IP ARCHITECTURE FOR INTRA-DOMAIN MOBILITY

CROSS REFERENCE TO RELATED APPLICATIONS

This application claims the benefit of U.S. Provisional Application No. 60/197,880, filed Apr. 17, 2000, the content of which are hereby incorporated by reference. This application is also related to U.S. application Ser. No. 09/834,234, entitled "Methods and Systems for Generalized Mobility Solution using a Dynamic Tunneling Agent," filed concurrently with the present application.

BACKGROUND OF THE INVENTION

This invention relates generally to wireless networks, and more particularly, to a method and system for facilitating mobility of a node within a domain or network.

The rapid growth of wireless networks and services, fueled by industry activity in the area of next generation mobile communication systems, has ushered in the era of ubiquitous computing. Lightweight portable computers, Internet Protocol-based (office and home) appliances, and the popularity of the Internet are providing strong incentives to service providers to support seamless user mobility. Realizing commercially viable Internet Protocol (IP) mobility support over the current cellular infrastructure, however, remains a challenge. In particular, for real-time multimedia (audio, video, and text) communications, user mobility poses several challenges.

Wireless access to telecommunication services has traditionally been provided through wide area cellular systems, which in turn are connected to the public telecommunication network backbones, such as the PSTN (Public Switched Telephone Network). It is expected that future wireless communications systems will be more heterogeneous and that every mobile user will be able to gain access to the Internet backbone by attaching his or her computer to a wireless access point. A telecommunication architecture that supports IP mobility will enable service providers to offer high-quality broadband multimedia services to mobile users in a cost effective way. Although, neither the Internet nor the telecommunications networks are currently designed to support high bandwidth, real-time multimedia services, a series of new technologies for third generation (3G) wireless systems are being developed to make this a reality. These technologies include IMT-2000 (International Mobile Telecommunications System), UMTS (Universal Mobile Telecommunication Systems), GPRS (General Packet Radio Service), EDGE (Enhance Data rate for GSM Evolution), CDMA-2000 (Code Division Multiple Access), and WCDMA (Wideband CDMA).

Mobility management in cellular networks is achieved in a different way than in IP-based networks. More precisely, mobility management enables telecommunication networks to locate mobile nodes, such as roaming wireless terminals for call delivery and to maintain connections as the nodes move into new service areas. Mobility management consists of two components, a location management and a handoff management. Location management enables the network to discover the current attachment point of the mobile user for call delivery. Handoff management enables the network to maintain connection to a mobile node as the mobile node continues to move and change its access point to the network.

User mobility in a cellular architecture supporting IP mobility may be broadly classified into three categories: micro-mobility, macro-mobility or intra-domain mobility, and global-mobility or inter-domain mobility. Micro-mobility refers to movement of a mobile node within or across different base stations within a subnet, and occurs very rapidly. Currently, management of micro-mobility is accomplished using link-layer support (layer-2 protocol). Macro-mobility refers to movement of a mobile node across different subnets within a single domain or region, and typically occurs relatively less frequently than micro-mobility but more frequently than global mobility. Macro-mobility is currently handled by Internet mobility protocols (layer-3), such as Mobile IP. Global mobility is the movement of a mobile node among different administrative domains or geographical regions. At present, global mobility is also handled by layer-3 protocols, such as Mobile IP.

In general, the goal of mobility management is to ensure continuous and seamless connectivity during micro-mobility and macro-mobility, which occur over relatively short time-scales. Global-mobility, on the other hand, usually involves longer time-scales—the goal there is often to ensure that mobile nodes can reestablish communication after a move rather than to provide continuous connectivity.

Several frameworks have been recently proposed to support seamless network access to mobile nodes. Among these proposals, Mobile IP and Session Initiation Protocol (SIP) have been currently standardized by the IETF (Internet Engineering Task Force). Mobile IP supports an application-transparent IP mobility, while SIP provides an application layer signaling protocol for creating, modifying and terminating sessions with one or more participants, both in wireline and wireless networks.

As will be discussed in more detail below, the basic Mobile IP protocol was designed to provide a near-term solution for mobile nodes, without requiring protocol upgrades in stationary correspondent nodes (CN) and routers. However, it does not consider the integration of additional functions such as authentication and billing, which are critical for successful adoption in commercial networks.

On the other hand, SIP is an application layer control (signaling) protocol that can establish, modify and terminate multimedia sessions or calls. Recently, an architecture has been proposed for SIP mobility support to avoid certain problems with Mobile IP. However, SIP mobility cannot support TCP connections and is also not suitable for micro- and macro-mobility.

Though the Mobile IP solution meets the goals of operational transparency and handoff support, it is not optimized for managing macro-mobility (or intra-domain mobility) in commercial cellular networks. In particular, a larger number of location update messages and the latency involved in communicating these update messages to remote nodes make Mobile IP unsuitable for supporting real-time applications on the Internet. It has thus become necessary to modify the basic Mobile IP architecture to obtain a more scalable solution that is consistent with the evolving cellular architecture and that also supports uninterrupted operations of real-time applications. This has led to the development of protocols like Hand-off Aware Wireless Access Internet Infrastructure (HAWAII) and Cellular IP. However, all of these solutions have limitations in dealing with intra-domain or macro-mobility in the telecommunications networks, and none is best suited for all services and applications.

Mobile IP provides an IP-based mobility solution allowing mobile nodes to maintain network connectivity while retaining their permanently assigned IP addresses. In particular, it enables the mobility of a node to be transparent to all executing applications. This is essentially achieved by providing the mobile node with an additional address (in addition to its permanent home address) that is topologically consistent with the network. This additional address is also referred to as a "care-of-address" and ensures that packets are forwarded using conventional IP routing to the current location of a mobile node in a foreign network. A foreign network may be a network other than a mobile node's permanent home network.

The basic Mobile IP specification allows for two distinct methods of operation:

1. The first mode of operation uses a foreign agent (FA) while a mobile node visits a foreign network, or a network other than the mobile node's home network. The FA provides the mobile node with a binding IP address that is consistent with the addressing scheme deployed in the foreign network. A mobile node can connect to the foreign network by registering the IP address of the FA with its home agent (HA), a statically assigned agent to the mobile node in its home network.

2. The second mode of operation does not require any agent support in the foreign network, but requires the mobile node to obtain a temporary IP address therein. A mobile node usually obtains this address from a specified pool using protocols, such as DHCP (dynamic host configuration protocol), and then uses its own co-located care-of-address in the foreign network.

The co-located address mechanism allows the mobile node to have direct control over the path of its own packets and also does not rely on the existence of additional agents in the foreign network. While this may currently seem to be an advantage, an agent-reliant mobility management scheme may be more advantageous in an integrated commercial telecommunications infrastructure.

The basic operational mode of Mobile IP architecture gives rise to the phenomenon of triangular routing. While packets from the mobile node usually follow a direct path to the correspondent nodes, packets from the correspondent nodes are re-routed via the mobile's home network to its point of attachment in a foreign network, from where they are forwarded to the current location of the mobile node. Enhancements have been suggested to avoid the triangular routing by essentially involving the transmission of binding messages to correspondent nodes. While this form of route-optimization will result in significant bandwidth savings by eliminating unnecessary path traversals, especially as the number of mobile nodes increases, it can give rise to significantly high latency during the location update process. However, route-optimization, at least in some modified form, is essential for supporting real-time communications in any future mobility enhanced network infrastructure.

Another approach to IP mobility support has been proposed in the new version of the Internet protocol, namely IPv6, which supports mobility management as an integral part of the protocol standards and does not require the presence of special agents in foreign networks. Location updates are directly transmitted from the mobile nodes to the correspondent nodes using binding update messages (a mobile node maintains a list of current correspondent nodes), thereby reducing the role of the home agent in the mobile node communication process. However, the transmission of binding updates directly to correspondent nodes can also result in a large update latency and can become a critical impediment to successfully supporting real-time applications. Moreover, the deployment of IPv6 infrastructure is still a futuristic goal and is likely to involve a prolonged period of coexistence with the current IPv4 infrastructure. Investigation and improvement of IPv4-based mobility mechanisms thus continues to be an area of practical concern.

In recent years, various solutions have been proposed to handle additional problems related to the Mobile IP-based mobility management, such as firewall traversal, reverse-tunneling or bidirectional tunneling. However, these enhancements are still not particularly suitable for supporting intra-domain mobility in cellular wireless networks. Particularly, the enhancements lack support for fast handoff control, real-time location update, registration and configuration. Moreover, the importance of application-transparent mobility has diminished in present scenarios as many applications (e.g., web browsing) are now able to internally handle network level mobility.

An extension to the Mobile IP has been proposed, which uses hierarchical foreign agents to handle intra-domain or macro-mobility. In this architecture, however, base stations are assumed to be network routers. Hence this is not compatible with the current cellular architectures, in which base stations are simply layer-2 forwarding agents. Moreover, deploying a hierarchy of foreign agents brings with it complex operational and security issues (especially in a commercial multi-provider environment) and requires multiple layers of packet processing on the data transport path. The presence of multiple layers of mobility-supporting agents also significantly increases the possibility of communication failure, as it does not exploit the inherent robustness of the Internet routing protocols.

Several IETF proposals have also explored the possibility of using hierarchical foreign agents for seamless mobility within a domain but have not been actively pursued in the recent past. The need for hierarchical agents in an Internet mobility architecture remains an open issue. While it does not appear to be a critical consideration in the immediate future, it is possible that hierarchical mobility management will become more attractive as the IP security infrastructure matures and a much larger number of mobile multimedia terminals are deployed.

A draft on Mobile IP regional tunnel management has been recently proposed in IETF. The proposal provides a scheme for performing registrations locally in the visited (foreign) domain, thereby reducing the number of signaling messages forwarded to the home network as well as lowering the signaling latency that occurs when a mobile node moves from one foreign agent to another. The draft addresses one of the important drawbacks in conventional Mobile IP. The suggested enhancement to the registration scheme uses a gateway foreign agent, which lies one level higher in the foreign agent hierarchy and provides a more stable global care-of-address to the mobile node.

Given the concerns for enabling IP-based mobility in a commercial environment, a few other protocols have been proposed to extend Mobile IP to better support micro- and macro-mobility in the next generation cellular environments, as discussed below.

The Handoff-Aware Wireless Access Internet Infrastructure (HAWAII) proposes a technique for using a separate binding protocol to handle intra-domain mobility (i.e., micro and macro-mobility) while using Mobile IP for inter-domain mobility. It suggests the use of a two-layer hierarchy for mobility management. When a mobile node moves into a foreign domain, it is assigned a co-located care-of-address from that domain and the mobile node maintains its care-of-address unchanged while moving within the foreign domain. Thus, the movement of the mobile node within a domain is transparent to the home agent. This protocol uses path setup messages to establish and update host-based routing entries for mobile nodes in only specific routers within the domain, while other routers not updated.

When a correspondent node sends packets to a roaming mobile node, it uses the mobile node's home IP address. The home agent intercepts the packets and sends the encapsulated packet to the mobile node's current border router. The border or root router decapsulates and again encapsulates the packet to forward it either to the intermediate router or to the base station which decapsulates the packet and finally delivers it to the mobile node.

Cellular IP proposes an alternative method to support local mobility (i.e., micro- and macro-mobility) in a cellular network, which consists of interconnected cellular IP nodes. This protocol uses Mobile IP for wide area mobility. It has many similarities with the host-based routing paradigm of HAWAII. In particular, Cellular IP is designed to support local mobility, such as between base stations in a cellular network. As mobile node addresses have no location significance inside a cellular IP network, the architecture uses the home IP address as a unique host identifier. When a mobile node enters a Cellular IP network, it communicates the address of a local gateway to its home agent as the care-of-address.

Nodes outside the Cellular IP network do not need any enhancements to communicate with nodes inside the network. When a correspondent node sends packets to a roaming mobile node, the correspondent node uses the mobile node's home IP address. As in conventional Mobile IP, the home agent intercepts the packets and sends the encapsulated packets to the mobile node's current gateway. The gateway decapsulates the packets and forwards them to the mobile node's home address using a node specific route. Thus, the nodes sending or receiving datagrams to/and from the mobile node remain unaware of the node's location inside the Cellular IP network.

Another framework for IP-based mobility management has been recently developed by the Telecommunications Industry Association (TIA) Standards Subcommittee TR45.6 to target the third generation cellular wireless systems. The requirements have been set by the International Telecommunications Union (ITU) for IMT-2000. The framework uses Mobile IP with foreign agents for inter-domain or global mobility. For intra-domain or macro-mobility, the scheme proposes the use of dynamic home agents (DHA), which reside in a serving network and are dynamically assigned by a visited Authentication, Authorization and Accounting (AAA) server. DHA allows a roaming mobile node to gain service with a local access service provider while avoiding unnecessarily long routing. The architecture defines a new node called Packet Data Serving Node (PDSN) (which contains the foreign agent), and uses VLR/HLR (ANSI-41 or GSM-MAP) authentication and authorization information for the access network. The mobile node is identified by an NAI (Network Access Identifier) in the visiting or foreign network. A mobile node sends the registration message to the foreign agent, which in turn interacts with an AAA server residing in that network.

Despite various enhancements, as well as protocols like HAWAII and Cellular IP, for mobility management in telecommunication networks, Mobile IP has several shortcomings. First, basic Mobile IP has a long handoff delay when a mobile node and its home agent or correspondent node are separated by many hops in a wide-area network. Location updates need to travel over the entire path from the mobile node to the home agent or correspondent node before the change in mobile location is effectively communicated and ongoing connections are restored. As a result, data in transit may be lost while the handoff completes and a new route to the mobile node has to be established.

Second, in different versions of Mobile IPv4 (with and without route optimization) and in Mobile IPv6, location updates are always generated whenever a mobile node changes a subnet in a foreign network. Since subnet changes occur fairly rapidly, this approach results in the frequent generation of location update messages. In regions having an extremely large population of mobile nodes, the signaling load can become a significant portion of the traffic.

Third, though the recent proposal on tunnel management discusses regional registration when the distance between the visited and home networks of a mobile node is large, it does not disclose an architecture applicable to telecommunication networks. Moreover, in this scheme, not only is the assignment of a gateway foreign agent (GFA) (a more stable globally valid care-of-address) to a mobile node performed by a foreign agent, the foreign agent transparently appends the GFA IP address information itself as a registration extension to the registration request message if the care-of-address field is set to zero while sending this to the home agent. Practical implementation of such mechanisms would require the maintenance of valid security associations between all foreign agents and the home agent, making the mobility management scheme significantly more complex. Further, the idea of having the home network distribute the registration key associated with a mobile node to the corresponding gateway foreign agent (to enable regional registrations in the visited domain) may weaken the strong security association paradigm between a home agent and a mobile node in the conventional Mobile IP.

Fourth, Mobile IP schemes specifying the use of co-located care-of-address implicitly assume the availability of a pool of public addresses. As mobile nodes become ubiquitous, the availability of such addresses becomes more critical. This is particularly relevant in cellular networks where service providers may be unwilling to spend resources to obtain chunks of the public address space upfront. Furthermore, the use of public addressees by arbitrary mobile nodes within a provider's domain may be restricted or prohibited due to, for example, security concerns and firewall restrictions.

Finally, since the current Mobile IP standard requires the mobile node to change the care-of-address at every subnet transition, it is harder to reserve network resources on an end-to-end path between a correspondent node and a mobile node. For example, if the Resource Reservation Protocol (RSVP) is used to make reservations for Quality of Service (QoS) sensitive traffic, new reservations over the entire data path must be set up whenever the care-of-address changes.

While HAWAII and Cellular IP may largely overcome the preceding limitations by ensuring that a mobile node maintains a single care-of-address while changing subnets or cells within a domain, this is achieved at the expense of requiring the establishment of source-specific routes within an administrative domain. Such a scheme, however, is not scalable, as the state information and route lookup complexity in the routers increases rapidly with an increase in the mobile node population. The propagation of source-specific routes within a single domain may significantly increase the signaling complexity.

The Wireless IP network architecture (TR45.6) design uses existing standard protocols for mobility management and Home Location Register/Visitor Location Register for location update. Though this scheme offers some flexibility in routing by assigning a dynamic home agent in a visitor network, it requires protocol upgrades at all correspondent nodes, thus limiting its market acceptance.

SUMMARY OF THE INVENTION

To overcome the above and other disadvantages of the prior art, methods and systems are provided to facilitate intra-domain mobility.

Methods and systems consistent with the present invention comprise a first network that includes a first agent including location information about a mobile node and a second network that includes two or more subnetworks and a second agent. An agent may include, for example, a globally accessible redirection agent, a home agent, or a session initiation protocol (SIP) proxy. The mobile node may then register with the second network, and consequently, may transition from any of the subnetworks to another subnetwork in the second network without communicating information to the first agent about the transition. Further, no communication to the second agent about a security association between the mobile node and the first agent is required, thus maintaining a strong security association between the first agent and the mobile node.

The first agent may intercept communications received in the first network and addressed to the mobile node and forward the communications to the second agent. The second agent may then forward the communications to the mobile node.

Additionally, a third agent may be provided in one of the subnetworks in the second network. The third agent may include, for example, a subnet agent, a dynamic host configuration protocol (DHCP) server, or a dynamic registration and configuration protocol (DRCP) server. The mobile node may register with the third agent, receive a local care-of-address and a global care-of-address, and then register with the second agent in the second network. The global care-of-address received from the third agent may include the address of the second agent. The mobile node may then provide the global care-of-address to the first agent. The second agent may use the local care-of-address to provide communication to the mobile node without requiring a mobile-node-specific route.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
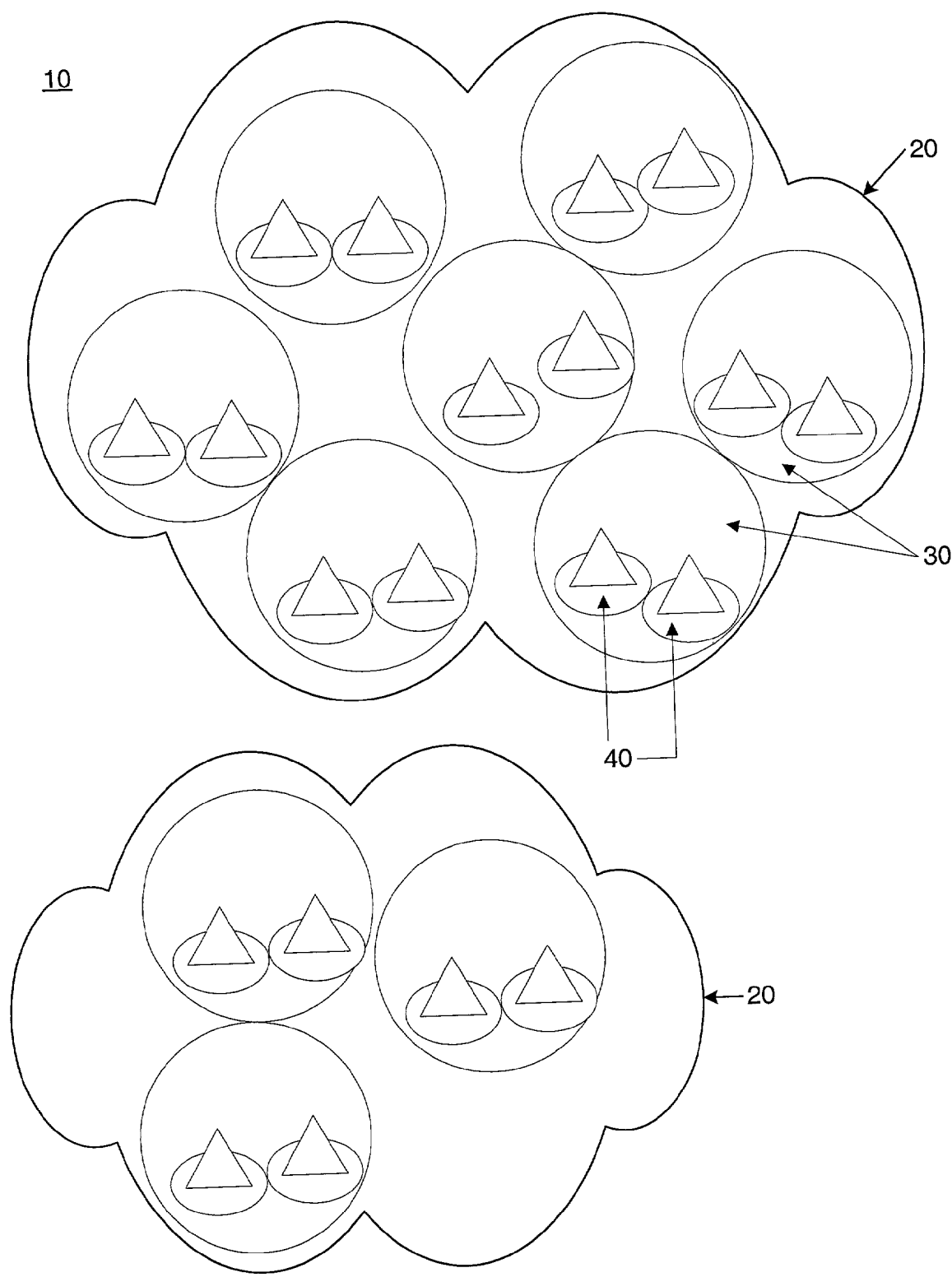
FIG. 1 illustrates an exemplary system in which an embodiment of the present invention may be implemented.

FIG. 1 illustrates an exemplary wireless system 10, in which an embodiment of the present invention may be implemented. As shown, system 10 includes a number of domains or networks 20 each including a plurality of subnetworks or subnets 30. Each subnet 30 includes a plurality of cells or base stations 40. As discussed above, a mobile node may transition across a number of boundaries between cells 40 and subnets 30. Further more, a mobile node may include a host or router that may change its location or point of attachment in the system. A host may include, for example, a wireless device or a portable personal computer.

The transition of a mobile node from a cell 40 to another cell 40 within the same subnet 30 is referred to as micro-mobility. For example, a subnet agent may manage the micro-mobility of a mobile node using layer-2 protocol. The transition of a mobile node from one subnet 30 to another subnet 30 within the same domain 20 is referred to as macro-mobility or intra-domain mobility. Finally, a mobile node may also transition from one domain 20 to another domain 20. This movement is referred to as global-mobility or inter-domain mobility and may be handled using layer-3 protocols, such as Mobile IP or application layer protocols, such as Session Initiation Protocol (SIP) using a SIP proxy (not shown).

Figure 2:
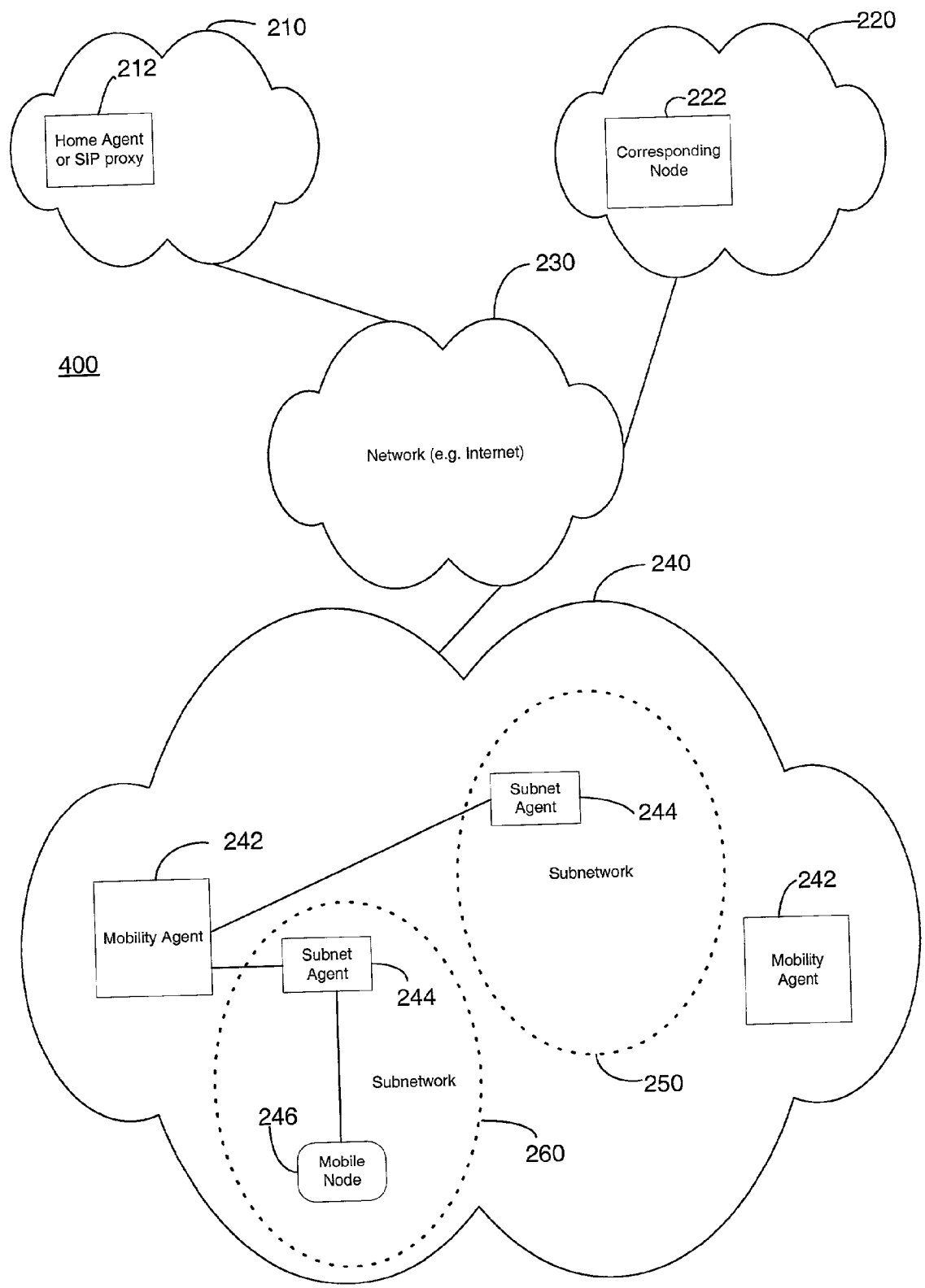
FIG. 2 illustrates a system for facilitating the intra-domain mobility of a mobile node, in accordance with an embodiment of the present invention.

FIG. 2 illustrates a system 200 for facilitating the intra-domain mobility of a mobile node 246, in accordance with an embodiment of the present invention. System 200 may include a home network 210, a correspondent network 220, and a foreign network 240, all connected via a network, such as the Internet 230. The home network 210 may include a network in which the mobile node 246 is given a long-term IP address. The foreign network 240 may include any network other than the mobile node's home network 210. The correspondent network 220 may include a host or router with which the mobile node 246 may communicate.

The home network 210 may include a globally accessible redirection agent, SIP proxy, or home agent 212, such as a router that maintains current location information for the mobile node, including a global care-of-address and other information about mobile nodes. For example, the home agent 212 may include a table associating the home address of each mobile node with a global address received from the mobile node. A global care-of-address may include a care-of-address for communications with nodes throughout system 200. Based on this stored information, the globally accessible redirection agent may forward communications to the mobile node 246. The home agent 212 may also include the home address of the mobile node 246, such as the long-term IP address in the home network 210. The home address of the mobile node 246 may remain unchanged, regardless of the mobile node's current location in the system 200. A communication may include information in one or more packets.

The correspondent network 220 may include a correspondent node 222, such as a host or router with which the mobile node may communicate. The correspondent node 222 may be either mobile or stationary.

The foreign network 240 may include a plurality of subnetworks, such as subnets 250 and 260, and one or more mobility agents (MAs) 242. An MA 242 may provide a global care-of-address, namely the address of the MA, to a mobile node and may intercept packets forwarded to the mobile node via the provided global care-of-address. MA 242 may be capable of handling mobile nodes located in one or more subnets 250 and 260.

Each subnet 250 and 260 may include at least one associated subnet agent 244, such as a router, a DHCP server, or a DRCP server. The subnet agent 244 may provide a local care-of-address and an address of MA 242 to a mobile node 246. Rather than requiring a change of all of the intermediate routers between the HA and the mobile node (such as in Cellular IP and HAWAII), the address of the MA is used outside of foreign network 240 and the LCOA is used within foreign network 240. The routing is then independent of the actual location of the mobile node 246.

Figure 3A:
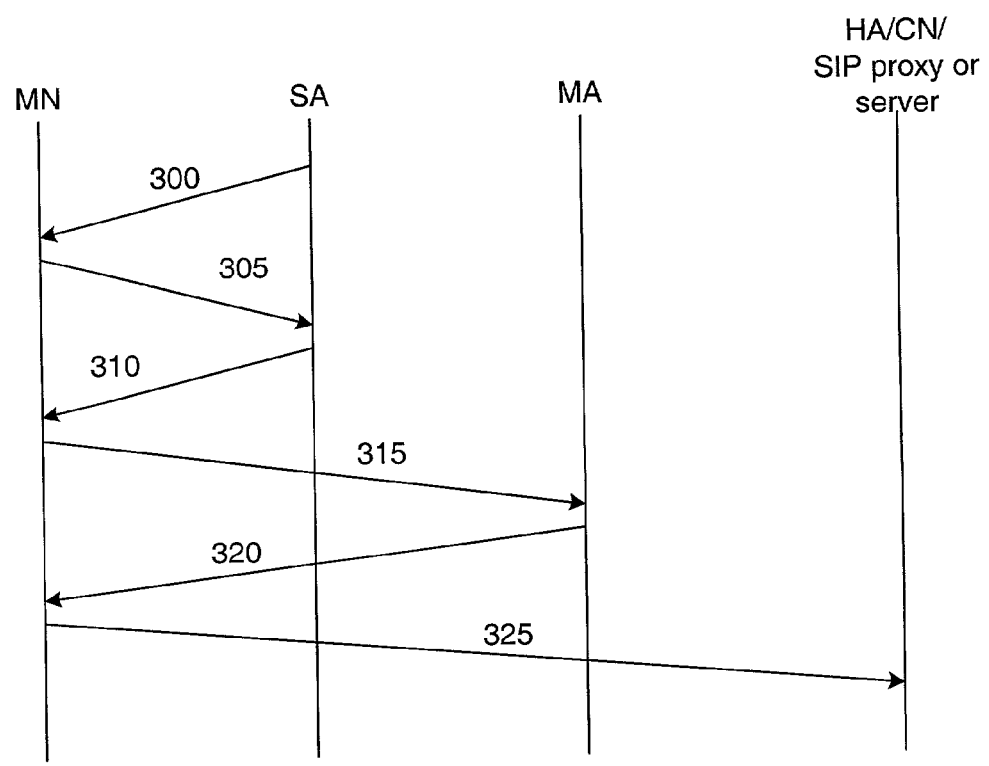
FIG. 3A is a message flow diagram representing communication between a mobile node, subnet agent, mobility agent, and a home agent, in accordance with an embodiment of the invention.

FIG. 3A is a diagram depicting the message flows between the mobile node 246 and other entities in the system 200, in accordance with an embodiment of the present invention. While in a particular subnet, for example subnet 260, the subnet agent 244 sends out an advertisement 300. The advertisement 300 may include, for example, an Internet Control Message Protocol (ICMP) router advertisement as specified in Mobile IP, "IP Mobility Support", C. Perkins ed., RFC 2002, October 1996, incorporated herein by reference, and further modified by using the unused bits to indicate the presence of a MA 242 in the foreign network 240. The mobile node receives the advertisement and replies with a request 305, which may include a registration request as specified in Mobile IP and modified to include additional bits indicating the use of an MA 242. The subnet agent replies 310 to the request 305, providing a global care-of-address (e.g., the address of the MA 242) and a local care-of-address. Reply 310 may include a registration reply as specified in Mobile IP and modified to include a global care-of-address and a local care-of-address.

A care-of-address may include the termination address for an encapsulated packet. The node at the care-of-address may decapsulate the packet and then either encapsulate the packet for further forwarding or may deliver the packet to the intended addressee. A global care-of-address may include a care-of-address for communications with nodes throughout system 200. A local care-of-address may include a care-of-address for communications only within a particular network, such as foreign network 240. The subnet agent 244 may assign local care-of-addresses from private address pools, thus conserving IPv4 address space. The encapsulation and decapsulation process will be described in further detail with respect to FIGS. 5 and 6.

The mobile node 246 then sends a registration request 315 to the MA 242. The MA 242 then replies with a shared global care-of-address (GCOA) 320, which may include the address of the MA. Registration request 315, similar to request 305, may include a registration request as specified in Mobile IP and modified to include additional bits indicating the use of an MA 242. The mobile node may then send an update 325 to the home agent 212 in network 210 or the correspondent node 222 in network 220. Update 325 may include registration request as specified in Mobile IP or other global mobility protocol, and may request the home agent to create or modify the association in the home agent's table between the mobile node's home address and its global care-of-address.

Figure 3B:
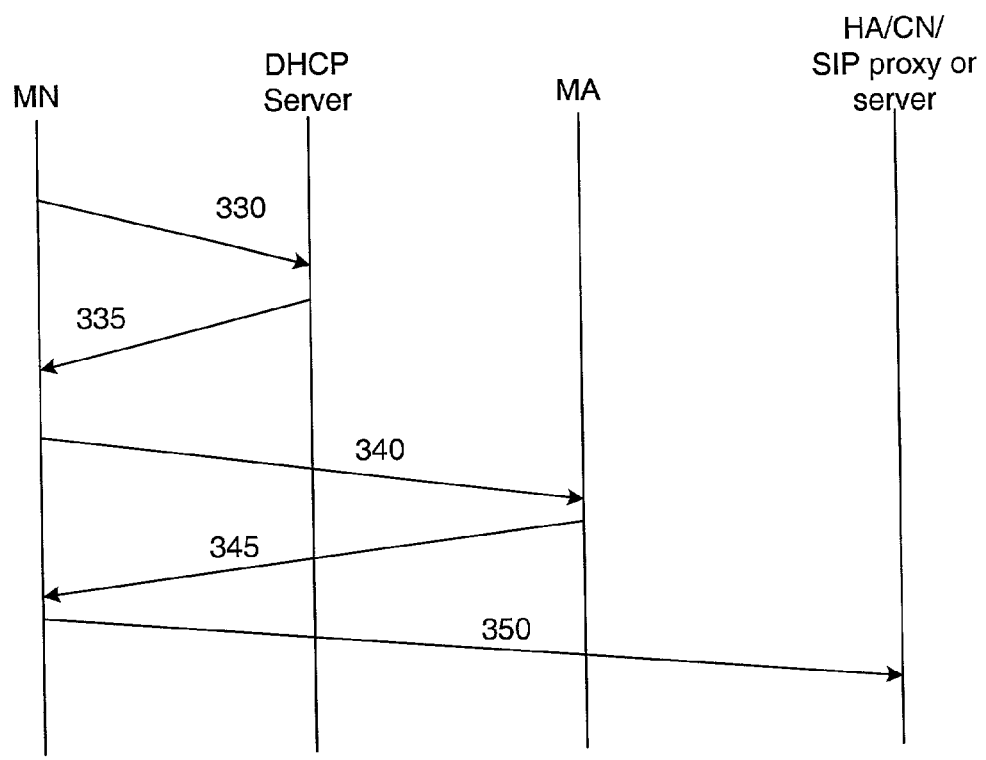
FIG. 3B is a message flow diagram representing communication between a mobile node, DHCP/DRCP server, mobility agent, and a home agent, in accordance with an embodiment of the invention.

Similarly, FIG. 3B is a diagram depicting the message flows between the 20 mobile node 246 and other entities in the system 200 when the subnet agent 244 includes a DHCP or DRCP server, in accordance with an embodiment of the present invention. First, the mobile node 246 sends a query 330 to discover the subnet agent 244. Query 330 may be similar to an ICMP Router Solicitation. The subnet agent 244 then provides the mobile node with a local care-of-address and a global care-of-address 335. The mobile node 246 then sends a registration request 340 to the MA 242. Registration request may include a registration request as specified in Mobile IP and modified to include additional bits indicating the use of an MA 242. The MA 242 replies with a shared global care-of-address 345, which may include the address of the MA. The mobile node 246 may then send an update 350 the home agent 212 or correspondent node 222. Update 350 may include registration request as specified in Mobile IP or other global mobility protocol, and may request the home agent to create or modify the association in the home agent's table between the mobile node's home address and its global care-of-address.

Because updates 325 or 350 to the home agent 212 or correspondent node 222 may be sent only when the mobile node 246 changes networks, latency and hand-off delay in system 200 is reduced. So long as a mobile node 246 remains in a network, such as, foreign network 240, the transition of the mobile node between subnetworks, for example subnetworks 250 and 260, may be transparent to the home agent 212. The mobile node 246, thus, may transition between subnetworks without communicating information about this transition to the home agent 212. Every time the mobile node 246 enters a different subnetwork 250 or 260, it may receive a different local care-of-address 310 or 335 from subnet agent 244. The mobile node 246 then provides the local care-of-address to the MA 242 for routing packets to the mobile node 246, localizing the scope of one or more location update messages within a network. However, the mobile node 246 may not transmit any location updates to the home agent 212, so long as it remains under the control of the MA 242. The home agent 212 sends all communications to the global care-of-address or the address of the MA provided in updates 325 or 350, thus providing continuous and seamless connectivity with respect to micro and macro-mobility of the mobile node.

Additionally, when the MA 242 or subnet agent 244 participate in the registration between the mobile node 246 and the home agent 212, the security association between the home agent 212 and the mobile node 246 must be shared with the MA 242 or subnet agent 244. However, in the present invention, all registration requests 315 and 340 may originate from the mobile node 246, therefore removing the need for security associations between the MA 242, subnet agents 244, and home agent 212. A security association may include a collection of security contexts between a pair of nodes, such as the mobile node 246, home agent 212, or MA 242, and may include an authentication algorithm and mode, a secret or shared key, and a style of replay protection.

Figure 4:
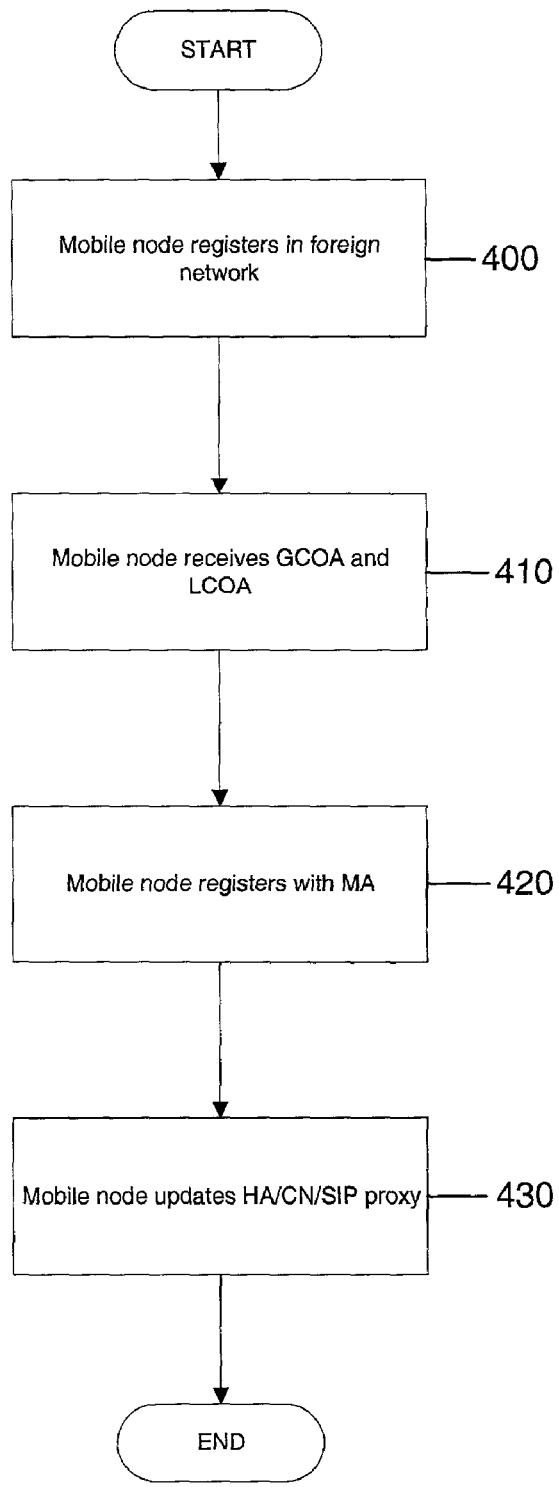
FIG. 4 is a flow chart of the steps for registering a mobile node in a foreign network, in accordance with an embodiment of the invention.

FIG. 4 is a flow chart of the steps for registering the mobile node 246 in foreign network 240, in accordance with an embodiment of the invention. As shown, the mobile node 246 first registers in foreign network 240 with a subnet agent 244, such as a router, DHCP server or a DRCP server (step 400). If subnet agent 244 includes a router, the registration process may include the message flows 300–305 shown in FIG. 3A. If subnet agent 244 includes a DHCP or DRCP server, the registration process may include query 330 shown in FIG. 3B.

From the subnet agent 244, the mobile node 246 may receive a global care-of-address (GCOA) and a local care-of-address (LCOA) shown as reply 310 in FIG. 3A and as 335 in FIG. 3B (step 410). The GCOA identifies the MA 242 with which the mobile node 246 may register. In networks with more than one MA, a mobility server (not shown) may dynamically allocate an MA for association with a mobile node. The mobility server may include information about all MAs in the foreign network 240, including mobile nodes being serviced by a MA. Using this information, the mobility server may use a dynamic allocation or load-balancing algorithm to allocate the MA that is experiencing the least heavy load. The mobility server may provide the identity and address of the allocated MA as the GCOA in this situation.

The mobile node 246 then may register with the identified MA 242 (step 420) by sending a request 315 or 340 to the MA. The MA replies to the request 315 or 340 by sending a shared GCOA 320 or 345 to the mobile node.

Finally, the mobile node 246 may provide the shared GCOA to the home agent 212, a correspondent node 222, or a SIP proxy (not shown) as a mobility update 325 or 350 including the GCOA (step 430).

Figure 5:
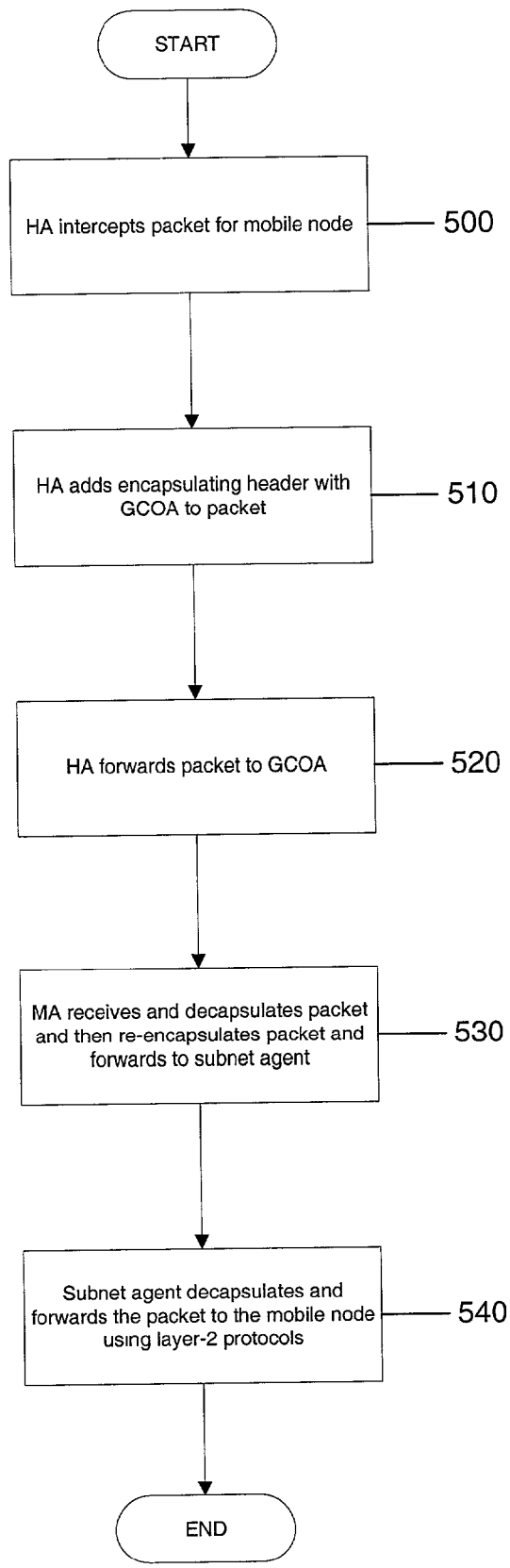
FIG. 5 is a flow chart of the steps for forwarding a communication to a mobile node in a foreign network, in accordance with an embodiment of the invention.

FIG. 5 is a flow chart of the steps for forwarding communication to the G mobile node 246 in foreign network 240, in accordance with an embodiment of the invention. For example, when the correspondent node 222 sends a packet addressed to the mobile node 246 to the home network 210, the home agent 212 intercepts the packet using, for example, an Address Resolution Protocol (ARP) (step 500). As specified in Mobile IP, when the mobile node 246 updates the home agent 212 with an attachment or location in foreign network 240 (step 430), the home agent 212 sends an ARP packet to cause other nodes to associate the address of the home agent 212 with the mobile node's home address. Thus, nodes sending packets to the home address of the mobile node 246 instead send the packets to the home agent 212.

The home agent 212 then may encapsulate the packet by adding an outer-destination address including the GCOA received from the mobile node 246 during step 430 of FIG. 4 (step 510). The home agent 212 then forwards the encapsulated packet to the GCOA, or the address of MA 242 (step 520).

The MA 242 receives the encapsulated packet, decapsulates the packet, and then re-encapsulates the packet for forwarding to the subnet agent 244 in subnetwork 260 (step 530). The MA 242 may intercept the packet using the ARP protocol. The MA 242 may determine the corresponding LCOA of the mobile node based on the inner-destination address or the home address of the mobile node in the decapsulated packet. The MA 242 then encapsulates the packet by adding an outer-destination address that includes the LCOA of the mobile node. The inner-destination address may remain the same as the GCOA address in the packet sent to the MA 242. The MA 242 then sends the packet to the LCOA, where a subnet agent may receive it. The MA 242 may encapsulate the packet using the IP-in-IP encapsulation protocol. Alternatively, the MA 242 may use a minimal encapsulation or GRE encapsulation method.

When the subnet agent 244 receives the encapsulated packet, it decapsulates the packet and forwards the packet to the mobile node 246 using layer-2 protocol (step 540). To decapsulate the packet, subnet agent 244 may remove the outer-destination address in the packet header. The subnet agent 244 then looks at the inner-destination address to determine which mobile node is the intended recipient of the packet.

Figure 6:
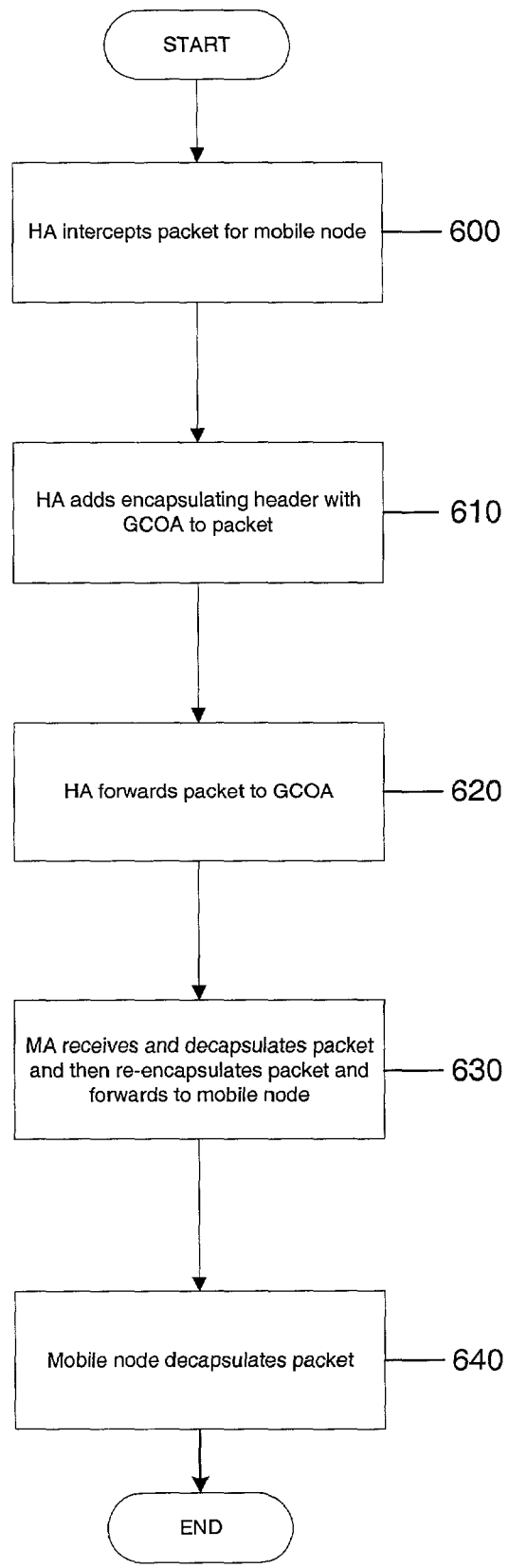
FIG. 6 is a flow chart of the steps for forwarding a communication to a mobile node in a foreign network when a subnet agent includes a DHCP or DRCP server, in accordance with an embodiment of the invention.

In a similar fashion, FIG. 6 is a flow chart of the steps for forwarding communications to the mobile node 246 in foreign network 240, when the subnet agent 244 includes a DHCP or DRCP server, in accordance with an embodiment of the invention. For example, when the correspondent node 222 sends a packet addressed to the mobile node 246 to the home network 210, the home agent 212 intercepts the packet (step 600). The home agent 212 then may encapsulate the packet by adding an outer-destination address including the GCOA received from the mobile node 246 during step 430 of FIG. 4 (step 610). The home agent 212 forwards the packet to the GCOA, or the address of the MA (step 620).

The MA 242 then decapsulates the packet and re-encapsulates the packet for forwarding to the mobile node 246 (step 630). To encapsulate the packet, the MA 242 may include the mobile node's LCOA in the outer-destination header of the packet. The MA 242 then sends the encapsulated packet to the LCOA. When the mobile node 246 receives the packet, it decapsulates the packet (step 640).

Additional features and embodiments consistent with the present invention may also be implemented using the methods and systems described in IETF Internet Draft "IDMP: An Intra-Domain Mobility Management Protocol using Mobility Agents", Misra A, Das S, McAuley A, Dutta A, and Das SK, Jul. 14, 2000, incorporated herein by reference.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for facilitating intra-domain mobility, said method comprising the steps of:

providing a first network that includes a first agent including location information about a mobile node;

providing a second network that includes two or more subnetworks and a second agent; and registering the mobile node with the second agent such that the mobile node transitions from any of the subnetworks to another subnetwork without communicating to the first agent information about the transition and without communicating to the second agent information about a security association between the mobile node and the first agent, and wherein the step of registering the mobile node with the second agent comprises the steps of:

receiving at the mobile node, a local care-of address (LCOA) and a global care-of-address (GCOA); and registering the mobile node with the second agent, wherein the LCOA is used to forward a communication to the mobile node without determining a specific route to the mobile node.

2. A method for facilitating intra-domain mobility, said method comprising the steps of:
providing a first network that includes a first agent including location information about a mobile node;
providing a second network that includes two or more subnetworks and a second agent; and
registering the mobile node with the second agent such that the mobile, node transitions from any of the subnetworks to another subnetwork without communicating to the first agent information about the transition and without communicating to the second agent information about a security association between the mobile node and the first agent; and
wherein the step of registering the mobile node with the second agent comprises the steps of:
registering the mobile node with a third agent associated with one of the subnetworks;
sending by the third agent, a local care-of address (LCOA) and a global care-of address (GCOA) to the mobile node; and
registering the mobile node with the second agent, wherein the LCOA is used to forward a communication to the mobile node without determining a specific route to the mobile node.

3. The method of claim 2, wherein the third agent includes a subnet agent.

4. The method of claim 2, wherein the third agent includes a dynamic host configuration protocol (DHCP) server.

5. The method of claim 2, wherein the third agent includes a dynamic configuration and registration protocol (DRCP) server.

6. The method of claim 2, wherein the GCOA includes an address of the second agent.

7. The method of claim 1, further comprising providing by the mobile node the GCOA to the first agent.

8. The method of claim 1, further comprising the steps of:
receiving in the first network a communication addressed to the mobile node;
intercepting the communication by the first agent;
forwarding, at the first agent, the communication to the GCOA;
intercepting the communication by the second agent; and
forwarding, at the second agent, the communication to the mobile node.

9. The method of claim 8, wherein the step of forwarding the communication to the mobile node comprises the steps of:
encapsulating the communication to include the LCOA of the mobile node; and
sending the encapsulated communication to the LCOA.

10. The method of claim 9, further comprising the steps of:
decapsulating the encapsulated communication by a third agent; and
forwarding the decapsulated communication to the mobile node.

11. A method for intra-domain mobility, said method comprising the steps of:
providing a first network that includes a first agent including location information about a mobile node;
providing a second network that includes two or more subnetworks and a second agent, the step of providing a second network includes providing at least two second agents;
registering the mobile node with a second agent such that the mobile node transitions from any of the subnetworks to another subnetwork without communicating to
the first agent information about the transition and without communicating to a second agent information about a security association between the mobile node and the first agent; and
wherein the step of registering the mobile node comprises the steps of:
providing a mobility server in the second network;
allocating dynamically by the mobility server one of the at least two second agents; and
registering the mobile node with the allocated second agent.

12. A system for facilitating intra-domain mobility, said system comprising:
a first network that includes a first agent including location information about a mobile node; and
a second network that includes two or more subnetworks and a second agent, wherein the second agent is programmed to allow the mobile node to transition from any of the subnetworks to another subnetwork without communicating information to the first agent about the transition and without communicating to the second agent information about a security association between the mobile node and the first agent, and
wherein the second network includes a third agent associated with one of the subnetworks, the third agent including a subnet agent.

13. A system for facilitating intra-domain mobility, said system comprising:
a first network that includes a first agent including location information about a mobile node; and
a second network that includes two or more subnetworks and a second agent, wherein the second agent is programmed to allow the mobile node to transition from any of the subnetworks to another subnetwork without communicating information to the first agent about the transition and without communicating to the second agent information about a security association between the mobile node and the first agent, and
wherein the second network includes a third agent associated with one of the subnetworks, the third agent including a DHCP server.

14. A system for facilitating intra-domain mobility, said system comprising:
a first network that includes a first agent including location information about a mobile node,
a second network that includes two or more subnetworks and a second agent, wherein the second agent is programmed to allow the mobile node to transition from any of the subnetworks to another subnetwork without communicating information to the first agent about the transition and without communicating to the second agent information about a security association between the mobile node and the first agent, and
wherein the second network includes a third agent associated with one of the subnetworks, the third agent including a DRCP server.

* * * * *

UNITED STATES PATENT AND TRADEMARK OFFICE
CERTIFICATE OF CORRECTION

| | | |
|---|---|---|
| PATENT NO. | : 6,992,995 B2 | Page 1 of 1 |
| APPLICATION NO. | : 09/834237 | |
| DATED | : January 31, 2006 | |
| INVENTOR(S) | : Agrawal et al. | |

It is certified that error appears in the above-identified patent and that said Letters Patent is hereby corrected as shown below:

In The Drawings

In Fig. 2, Sheet 2 of 6, delete "400" and insert -- 200 --, therefor.

In The Specification

In Column 1, Line 9, delete "content" and insert -- contents --, therefor.

In Column 8, Line 20, delete "DESCRIPTION" and insert -- DETAILED DESCRIPTION --, therefor.

In Column 10, Line 16, delete "20 mobile" and insert -- mobile --, therefor.

In Column 11, Line 35, delete "G mobile" and insert -- mobile --, therefor.

In The Claims

In Column 12, Line 66, in Claim 1, delete "care-of address" and
insert -- care-of-address --, therefor at each occurrence throughout the claims.

In Column 13, Line 12, in Claim 2, delete "mobile, node" and insert -- mobile node --, therefor.

In Column 13, Line 34, in Claim 5, delete "dynamic configuration and registration protocol" and insert
-- dynamic registration and configuration protocol --, therefor.

Signed and Sealed this
Twenty-fourth Day of February, 2015

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 6,992,995 B2 | Page 1 of 1 |
| APPLICATION NO. | : 09/834237 | |
| DATED | : January 31, 2006 | |
| INVENTOR(S) | : Agrawal et al. | |

It is certified that error appears in the above-identified patent and that said Letters Patent is hereby corrected as shown below:

On the title page, in the illustrative figure, delete "400" and insert -- 200 --.

In The Drawings

In Fig. 2, Sheet 2 of 6, delete "400" and insert -- 200 --, therefor.

In The Specification

In Column 1, Line 9, delete "content" and insert -- contents --, therefor.

In Column 8, Line 20, delete "DESCRIPTION" and insert -- DETAILED DESCRIPTION --, therefor.

In Column 10, Line 16, delete "20 mobile" and insert -- mobile --, therefor.

In Column 11, Line 35, delete "G mobile" and insert -- mobile --, therefor.

In The Claims

In Column 12, Line 66, in Claim 1, delete "care-of address" and
insert -- care-of-address --, therefor at each occurrence throughout the claims.

In Column 13, Line 12, in Claim 2, delete "mobile, node" and insert -- mobile node --, therefor.

In Column 13, Line 34, in Claim 5, delete "dynamic configuration and registration protocol" and insert
-- dynamic registration and configuration protocol --, therefor.

This certificate supersedes the Certificate of Correction issued February 24, 2015.

Signed and Sealed this
Seventeenth Day of March, 2015

Michelle K. Lee
*Director of the United States Patent and Trademark Office*